United States Patent [19]

Genero et al.

[11] Patent Number: 5,446,948
[45] Date of Patent: Sep. 5, 1995

[54] ENGAGING DEVICE FOR RELEASABLY ENGAGING AN OBJECT

[76] Inventors: Claude P. Genero; Gail A. Genero, both of 30 Phillips Street, Dianella, Australia, WA 6062

[21] Appl. No.: 50,310
[22] PCT Filed: Nov. 20, 1991
[86] PCT No.: PCT/AU91/00528
    § 371 Date: May 11, 1993
    § 102(e) Date: May 11, 1993
[87] PCT Pub. No.: WO92/08578
    PCT Pub. Date: May 29, 1992

[30] Foreign Application Priority Data

Nov. 20, 1990 [AU] Australia .................. PK3426
Mar. 5, 1991 [AU] Australia .................. PK4925

[51] Int. Cl.6 ........................... B25B 5/04; B25B 5/12
[52] U.S. Cl. ........................... 24/327; 24/337; 24/495; 24/498
[58] Field of Search .......... 24/327, 328, 337, 338, 24/495, 497, 498, 517

[56] References Cited

U.S. PATENT DOCUMENTS

| | | | |
|---|---|---|---|
| 3,807,675 | 4/1974 | Seckerson | 24/337 X |
| 4,071,930 | 2/1978 | Tanaka | 24/252 R |
| 4,240,604 | 12/1980 | Brach | 248/316 D |
| 4,514,885 | 5/1985 | Delahousse et al. | 24/557 |
| 4,716,811 | 1/1988 | Johnson | 24/495 X |
| 4,870,722 | 10/1989 | Shell | 24/495 X |

FOREIGN PATENT DOCUMENTS

| | | |
|---|---|---|
| 639708 | 7/1950 | United Kingdom . |
| 1104589 | 2/1968 | United Kingdom . |
| 1212248 | 11/1970 | United Kingdom . |

Primary Examiner—Richard E. Gluck

[57] ABSTRACT

An engaging device for releasably engaging an object. The engaging device comprising a supporting part and an engaging part mounted on the supporting part, for pivotal movement about two spaced apart axes defined by pivot pins, between a stable engaging condition and a stable release condition. A portion of the engaging part disposed between the two axes is resiliently flexible and adapted to undergo resilient deflection as the engaging part moves between the two stable conditions thereby to urge the engaging part into one or the other of the stable conditions. The supporting part may define a housing which accommodates the engaging part and which provides structural rigidity.

59 Claims, 6 Drawing Sheets

5,446,948

ENGAGING DEVICE FOR RELEASABLY ENGAGING AN OBJECT

TECHNICAL FIELD

THIS INVENTION relates to an engaging device for releasably engaging an object. The engaging device may find application in various fields where it is necessary to releasably engage an object in a simple yet effective manner.

BACKGROUND ART

There are various engaging devices which move between engaging and release conditions by way of a snap-action process. Typical of such devices is an articulable article which is described and illustrated in GB 1212248 (Westhem) and which is well adapted for use as a clipping or gripping device. The articulated article, when functioning as a gripping device, comprises first and second swingable members movable between closed (engaging) and an open (release) positions. The swingable members are mounted on a resiliently bendable support structure comprising two upright members, the first swingable member being hingedly joined to one of the upright members through a flexible web constituting a first hinge line and the second swingable member being hingedly joined to the other of the upright members through a further flexible web constituting a second hinge line. The first and second swingable members are hingedly joined together through a third hinge line. The resiliently bendable characteristic of the support structure is provided by at least one of the upright members being resiliently bendable so allowing the two swingable members to swing respectively about the first and second hinge lines between the open and closed positions. In moving between the open and closed positions, the swingable members move through an unstable "over-toggling" position in which the three hinge lines are in alignment, and the resiliently bendable support structure deflects outwardly to accommodate this movement. As the support structure deflects outwardly, its resilient nature influences the swingable members and produces the snap-action between the open and closed positions.

Somewhat similar engaging devices are disclosed in U.S. Pat. No. 4,071,930 (Tanaka), U.S. Pat. No. 4,240,604 (Brach) and U.S. Pat. No. 4,514,885 (Delahousse).

A common feature of all of the aforementioned prior art engaging devices is that the swingable members are supported on a support structure which is resiliently bendable to allow the arms to swing through an "over-toggling" position, with the resilient nature of the support structure influencing the swingable members as they move between two stable positions one each side of the unstable "over-toggling" position.

A further common feature of the prior art devices is that they are of one-piece construction with various sections connected together with film hinges. This has disadvantages in certain circumstances. One disadvantage is a limitation in the strength that can be achieved at the film hinges. Another disadvantage is that the support structure interferes which access to the inner side of the swingable members.

While the prior art engaging devices do perform satisfactorily in many situations, there are other situations in with it would be useful to have a snap-action engaging device which does not have a resiliently bendable support structure of the kind used in the aforementioned prior art engaging devices.

DISCLOSURE OF INVENTION

The present invention seeks to provide such an engaging device.

Thus in one form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, wherein the two axes are fixed against lateral displacement with respect to each other during movement of the engaging part between the two stable conditions and wherein a portion of the engaging part disposed between the two axes is of resilient construction to accommodate movement of the engaging part between the two stable conditions and to urge the engaging part into one or the other of the two stable conditions.

With this arrangement, compressive stresses are induced into said portion of the engaging part as it moves between the two stable conditions thereby to urge the engaging part towards one of or the other of the two stable conditions with a snap-action. This is a feature which distinguishes the present invention from the aforementioned prior art devices which utilise a resiliently bendable support structure to urge the swingable members into closed or opened positions. This construction also allows the engaging part and the supporting part to be formed separately of each other and so overcomes some of the disadvantages of the prior art devices which are of one-piece construction.

In the engaging device of the present invention the two pivot axes about which the engaging part pivots are preferably permanently fixed against lateral displacement with respect to each other during movement of the engaging part between the two stable conditions.

The engaging part may comprise two spaced arm portions and an elongated bridge portion extending between said arm portions, said arm portions each being mounted on said supporting part for pivotal movement about a respective one of the pivot axes between a first position corresponding to said engaging condition and a second position corresponding to said release condition, the bridge portion providing said portion disposed between the pivot axes.

Preferably, the bridge portion is resiliently bendable in two mutually perpendicular directions to provide said resilient construction of said portion of the engaging part. The two mutually perpendicular directions may comprise a first direction generally parallel with the pivot axes and a second direction being in the direction of movement of said bridge portion as the engaging part moves between the two stable conditions.

The bridge portion may be provided with a reduced section to accommodate the resilient deflection. The reduced section may comprise a flexure point formed in the bridge portion.

While each pivot axis may each be defined by any suitable hinge, it is preferably defined by a pivot pin provided on the supporting part. With such an arrangement, a hole is provided in each arm portion for receiving a respective one of the pivot pins, the spacing between the holes being slightly larger than the spacing between said pivot pins so that axial compression is induced in the bridge portion as the engaging part moves between the two stable conditions. The feature of the pivot pins can provide the engaging device with advantages over the aforementioned prior art devices which are limited to film hinges. One such advantage is in the strength of the hinges. Another advantage is that the pivot pins are supported at a location offset from the engaging part and so the supporting part does not interfere with access to the inner side of the engaging part.

The arm portions and the bridge portion are preferably formed integrally with each other.

The supporting part preferably comprises a housing which accommodates the engaging part. An advantage of this arrangement is that housing can provide structural rigidity to the device so allowing the engaging part to be less rigid in construction.

The engaging part can be as thick and as rigid as is desired, it only being necessary that portion thereof between the two axes have the necessary resilient flexibility to allow the device to function.

In another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, the two axes being defined by means carried on portion of the supporting part, the engaging part being located to one side of said portion of the supporting part in a direction along the pivot axes such that the engaging part is offset from said portion of the supporting part.

The means defining the two axes may comprise two pivot pins at least one end of each of which is supported on said portion of the supporting part offset from the engaging part.

In another form the invention resides in an engaging device for releasably engaging an object, the engaging device comprising a substantially rigid supporting part, an engaging part mounted on the supporting part for pivotal movement about two spaced apart axes between two stable conditions one being an engaging condition and the other being a release condition, wherein the two axes are fixed both with respect to the supporting part and with respect to each other during movement of the engaging part between the two stable conditions and wherein a portion of the engaging part disposed between the two axes is of a construction which accommodates movement of the engaging part between the two stable conditions and which urges the engaging part into one or the other of the two stable conditions.

In still another form the invention resides in an engaging device for releasably engaging an object, the engaging device comprising a supporting part, an engaging part mounted on the supporting part for movement between engaging and release conditions, said engaging part having a first portion and a second portion, the first portion being adapted to co-operate with said supporting part to engage the object when in the engaging position, the second portion being exposed for contact with the object when the engaging part is in the release condition whereby upon such contact at a predetermined magnitude of force said engaging part is caused to move from the release condition into the engaging condition.

The first portion of the engaging part may comprise a pair of arm portions and said second portion comprises a bridge portion extending between the arm portions.

Preferably, the supporting part comprises a housing accommodating said engaging part. The housing preferably has a recess for receiving said object whereby the object is releasably retained in said recess when the first portion of the engaging part is co-operating with said recess. With this construction, the arm portions preferably extend into said recess when the engaging part is in the engaging condition and the bridge portion extends into the recess when the engaging part is in the release condition.

The feature of the recess co-operating with the engaging part to releasably engage the object is particularly useful as the inner edge of the recess can isolate the bridge portion from the object when the engaging part is in the engaging condition, In this way it is not necessary for the bridge portion to have sufficient strength and rigidity to support the object.

BRIEF DESCRIPTION OF DRAWINGS

The invention will be better understood by reference to the following description of various specific embodiments as shown in the accompanying drawings in which.

MODES OF CARRYING OUT INVENTION

Referring now to FIGS. 1 to 7 of the drawings, the engaging device 10 according to the first embodiment is adapted to releasably engage an object 11 of rectangular crosssection. The engaging device of this embodiment can engage and release the object simply by pushing it into contact with the object and pulling it out of contact with the object, as will be explained later.

Figure 1:
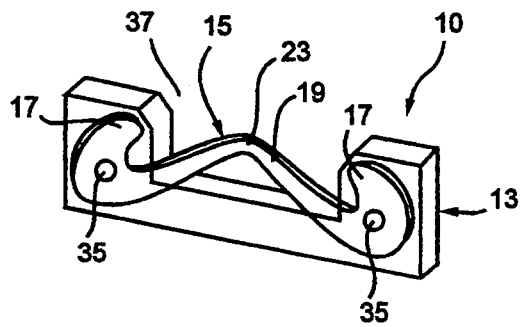
FIG. 1 is a perspective view of an engaging device according to a first embodiment.
Figure 2:
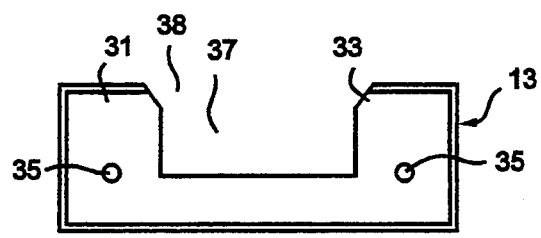
FIG. 2 is a schematic plan view of a supporting part of the engaging device according to the first embodiment.
Figure 3:
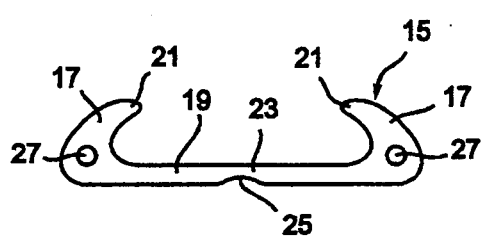
FIG. 3 is a schematic plan view of an engaging part of the engaging device according to the first embodiment.
Figure 4:
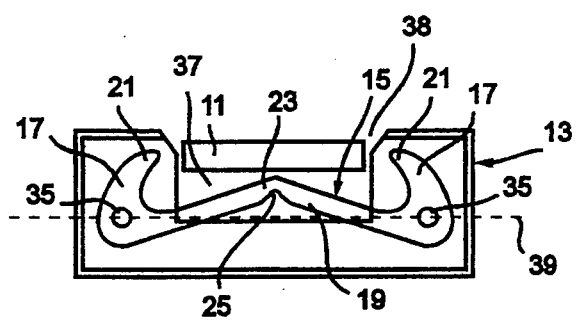
FIG. 4 is a plan view of the engaging device according to the first embodiment shown in a release position but in readiness to engage an object.
Figure 5:
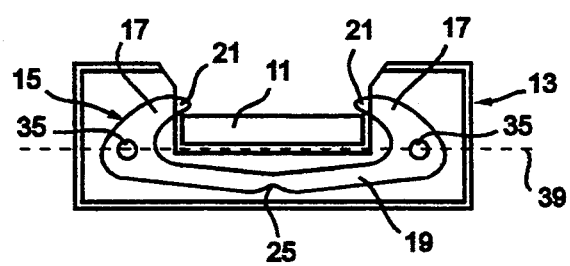
FIG. 5 is a view similar to FIG. 4 with the exception that the engaging device is shown in an engaging position in which it has engaged the object.

The engaging device 10 comprises a supporting part 13 and an engaging part 15 mounted on the supporting part for movement between two stable conditions, one being an engaging condition (as shown in FIG. 5 of the drawings) in which the engaging device is in engagement with the object and the other being a release condition (as shown in FIG. 4 of the drawings) in which the object 11 can be separated from the engaging device.

The engaging part 15 comprises a pair of spaced arm portions 17 and an elongated bridge portion 19 extending between the arm portions 17. The arm portions 17 are so configured that the free ends thereof define claws 21 which can close around the object 11 when the engaging device is in the engaging condition.

Figure 6:
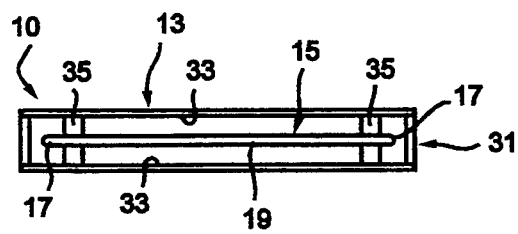
FIG. 6 is a side view showing the engaging device with the engaging part in a stable position corresponding to either the engaging position or the release position of the engaging device.
Figure 7:
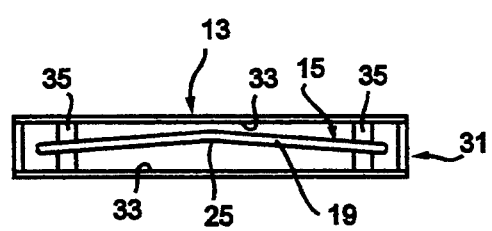
FIG. 7 is a view similar to FIG. 6 with the exception that the engaging part is shown in an unstable position in which the bridge portion of the engaging part has deflected laterally in a direction generally parallel to the axes about which the engaging part pivots.

The arm portions 17 and the bridge portion 19 are of integral construction and can be formed from a sheet of plastics material which can resiliently bend laterally, such as polypropylene. The integral arm portions and bridge portion can be formed from the sheet material by any suitable process although stamping is particularly appropriate. With this construction, the engaging part is thin in edge profile, as can be seen in FIGS. 6 and 7 of the drawings, and the bridge portion is resilient. More particularly, the bridge portion is resiliently bendable laterally. The bridge portion is also constructed to be bendable along its length in a direction generally perpendicular to the lateral direction referred to previously. Such a construction may be achieved by providing the bridge portion with a reduced section 23 which facilitates the bending action. In this embodiment, the reduced section comprises a flexure point 25 formed in the bridge section. The flexure point 25 serves to divide the engaging part 15 into two sections which can bend with respect to each other at the flexure point in the two mutually perpendicular directions, both of which are transverse to the longitudinal axis of the bridge portion.

The engaging part 15 is provided with a pivot hole 27 in each arm portion 17 at a location between the bridge portion and the free end of the arm, the purpose of which will be explained later.

The supporting part 13 comprises a housing 31 having a cavity which accommodates the engaging part 15, the cavity being defined between a pair of spaced apart housing walls 33. A pair of pivot pins 35 extend between, and are rigidly supported at their respective ends on, the housing walls. As the pivot pins 35 are rigidly supported at their ends on the housing walls, they are fixed against movement with respect to each other. The supporting part 13 accommodates the engaging part 15 in the housing 31 with the pivot pins 35 received within the pivot holes 27 in the engaging part. With this arrangement, the pivot pins 35 define pivot axes about which the arm portions 17 can pivot on movement of the engaging part between the engaging and release conditions. This construction results in the walls 33 of the housing being located on opposed sides of the engaging part in a direction along the pivot axes. In other words, the engaging part is located to one side (being the inner side) of each of the housing walls 33 in the direction along the pivot axes such that the engaging part is offset from the housing wall. Furthermore, the pivot pins are supported at locations offset from the engaging part.

A benefit of this construction is that the walls of the housing can be vacuum formed with the pivot pins being formed integrally with one of the walls.

The housing also has a recess 37 for receiving the object 11 to be engaged by the engaging device. The recess 37 opens at 38 onto an edge of the housing. The engaging part is disposed within the housing such that when it is in the engaging condition (as shown in FIG. 5 of the drawings) the claws 21 extend into the recess and the bridge portion is disposed partly or wholly within the confines of the housing. On the other hand, when the engaging part is in the release condition (as shown in FIG. 4 of the drawings), the claws 21 are retracted from the recess and the central region of the bridge portion 19 extends into the recess from the side of the housing opposite the opening at 38.

The bridge portion 19 is movable between two extreme positions, one being a first position corresponding to the engaging condition of the engaging part 15 and the other being a second position corresponding to the released position. The spacing between the pivot pins 35 is fixed and is less than the distance between the pivot holes 27 in the engaging part 15 prior to fitting of the engaging part on the supporting part. Consequently, the bridge portion 19 is in a state of axial compression and undergoes further axial compression as it moves between the two extreme positions. There is an unstable zone between the two extreme positions which results in the bridge portion being urged into one or the other of the two extreme positions. As the bridge portion passes through the unstable zone, it moves through an "over-toggling" or "over-center" condition in which the flexure point 25 crosses a line 39 (as shown in FIGS. 4 and 5) extending between the pivot axes defined by the pivot pins 35. The unstable condition of the bridge portion 19 arises because the bridge portion is caused to deflect resiliently as it passes through the unstable zone to accommodate movement between the two extreme positions. The resilient deflection occurs about the flexure point 25 with the two sections of the engaging part on opposed sides of the flexure point bending with respect to each other in the two mutually perpendicular directions.

Bending of the bridge portion in one of the mutually perpendicular directions can be seen by reference to FIGS. 6 and 7 of the drawings. In FIG. 6, the bridge portion is shown in a normal (undeflected) condition as is the case when it is at either one of the two extreme positions. In FIG. 7, the bridge portion is shown in a condition where it has undergone bending in the lateral direction. This bending introduces stresses into the bridge portion which urge it to one or the other of extreme positions.

Bending of the bridge portion in the other of the mutually perpendicular directions can be seen by reference to FIGS. 4 and 5 where it is evident that the inclination between the two sections of the bridge portion on opposed sides of the flexure point 25 has changed.

The tendency for the bridge portion to assume one or the other of the extreme positions is manifested as a snapping action whereby the bridge portion snaps from one extreme position to the other extreme position after passing through the unstable zone. This snapping action generates a snapping sound which provides an audible indication that the engaging part has moved between the engaging condition and the release condition.

Once the bridge portion 19 is in one of its extreme positions, it remains in that position until subjected to an external influence. In the present embodiment, the external influence comprises a force of predetermined magnitude applied to the engaging part 15. The necessary force arises as a result of reaction between the engaging part 15 and the object 11 being engaged. This allows the engaging device to be engaged with the object by simply pushing the engaging device and the object together, and to be separated from each other simply by pulling the object and the engaging device apart. Specifically, when it is to be engaged by the engaging device, the object 11 is introduced into the recess 37; at this stage, the engaging part has the claws 21 retracted and the central region of the bridge portion 19 extends into the recess. As the object enters the recess, it contacts, and bears against, the central region of the bridge portion. If the contact force exceeds a predetermined magnitude, the bridge portion is caused to move through the unstable zone and assume the other extreme position in which the claws extend into the recess around the object. In this way, the object is secured to the engaging device. The object is released from the engaging device by retracting the claws 21 and this can be accomplished by applying a pulling force between the object and the engaging device so as to create a reaction between the claws and the object which produces torque on each of the claws of sufficient magnitude to cause claws to swing and to move the bridge portion 19 through the unstable "over-toggling" position into the other extreme position corresponding to the release condition of the engaging device.

Figure 8:
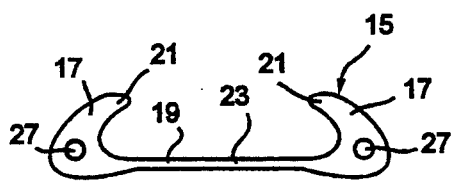
FIG. 8 is a view of a modified form of engaging part which does not utilise a flexure point in the bridge portion to accommodate resilient deflection.

In the first embodiment, the bending action of the bridge portion 19 was accommodated by the flexure point 25. The presence of a flexure point is not, however, essential as the bending action can be accommodated in other ways such as by a suitable narrowing of the bridge portion, as shown in FIG. 8 of the drawings. It is merely necessary for the bridge portion to be of some construction which allows it to bend in two mutually perpendicular directions, with the bending action in the lateral direction being resilient.

Figure 9:
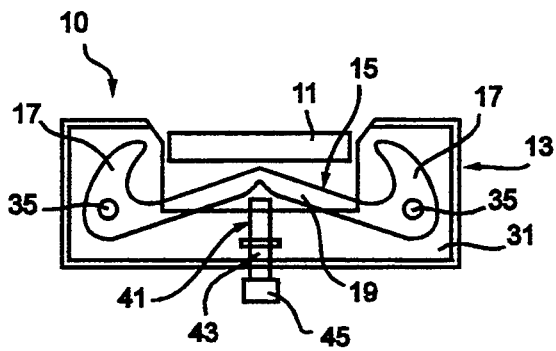
FIG. 9 is a schematic plan view of an engaging device according to another embodiment incorporating a control means operable to move the engaging part from the engaging position to the release position.

In the first embodiment, the engaging device was moved from the engaging position to the release position simply by applying a pulling force between the object and the engaging device of sufficient magnitude to cause the arm portions to swing about their pivot axes and thereby cause the bridge portion to move from the first extreme position through the unstable zone into the second extreme position. There may, however, be situations where it is undesirable or inappropriate to have to apply a pulling force between the object and the engaging device to effect release of the object. To accommodate such situations, an engaging device according to the third embodiment as shown in FIG. 9 is provided with control means 41 for manually operating the engaging device to move the engaging part from the engaging condition to the released condition. The control means 41 comprises a control member 43 mounted for reciprocal movement in the housing 31 for movement towards and away from the bridge portion 19 of the engaging part 15. One end of the control member 43 is engagable with the bridge portion 19 when the latter is in the first extreme portion (corresponding to the engaging condition of the engaging device) such that it can push the bridge portion from that position through the unstable zone into the second extreme position. The other end of the control member is exposed for engagement by the user and in this embodiment is provided with a button 45 for such purpose.

Figure 10:
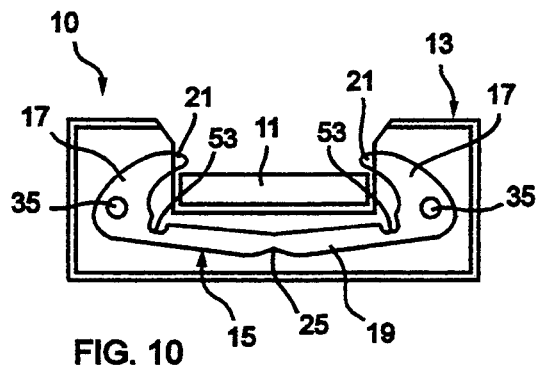
FIG. 10 is a plan view of an engaging device according to another embodiment, shown in an engaging position.
Figure 11:
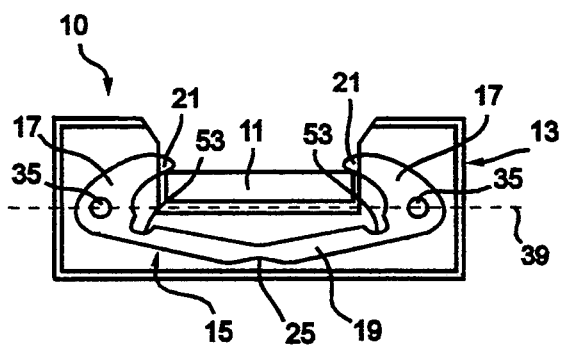
FIG. 11 is a view similar to FIG. 10 with the exception that it illustrates the reaction of the engaging device in circumstances where there is an attempt to release the engaging device from the object being engaged without first moving the engaging part into the release condition.

There may be situations where it is desirable to ensure that the engaging device cannot be operated to release an object simply by applying pulling forces between the object and the engaging part. Such a need can be met by an engaging device according to the embodiment shown in FIGS. 10 and 11 of the accompanying drawings. In this embodiment, the engaging part 15 is provided with a weakening which allows the arm portions to deflect without resulting in movement of the bridge portion from a stable position being occupied. This weakening is achieved by the provision of a notch 53 on the inner edge of the engaging part in the vicinity of the junction between the bridge portion 19 and each arm portion 17. If there is an attempt to detach the object from the engaging device simply by pulling on the object, reaction forces between the object and the engaging part causes the arm portions to deflect about the notches (as shown in FIG. 11 of the drawings) with the result that the bridge portion is caused to deflect away from the line 39 between the two pivot pins 35 rather than towards it. While not shown in the drawings, the engaging device according to this embodiment requires a control means or other system for causing the engaging part to assume the release condition as the engaging part cannot move from the engaging condition to the release condition by the application of force to the arm portions. This arrangement does, however, allow the engaging part to move from a release condition to an engaging position by contact of the object with the bridge portion when the latter extends into the recess.

Where notches 53 are provided they may form flexure points for the bridge portion additional to the flexure point 25. The additional flexure points may accommodate some of the resilient deflection of the bridge portion.

Figure 12:
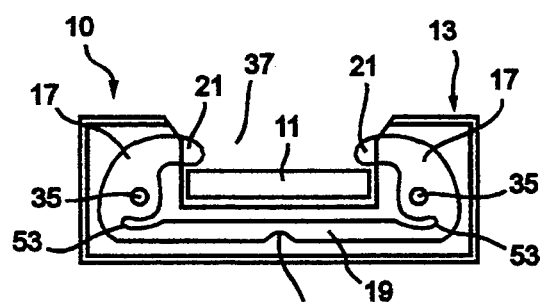
FIG. 12 is a schematic plan view of an engaging device according to another embodiment, shown in an engaging position.
Figure 13:
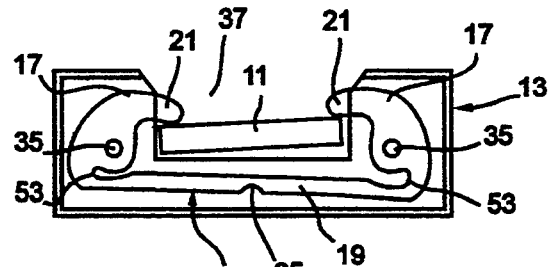
FIG. 13 is a view similar to FIG. 12 with the exception that it illustrates the reaction of the engaging part in circumstances where there is an attempt to release the object from the engaging device without first moving the engaging part into the release condition.

There may be other situations where it is desirable to ensure that the engaging part will only release an object being engaged when the object is pulled from the engaging device along a straight path rather than askew. Such a situation is accommodated by an engaging device according to the embodiment shown in FIGS. 12 and 13 of the accompanying drawings. This embodiment is somewhat similar to the immediately proceeding embodiment in the sense that notches 53 are provided in the engaging part but in this case the notches are so arranged that they allow the engaging part 15 to twist swing sidewardly about the pivot axes defined by pivot pins 35 (as shown in FIG. 13) when unequal forces are applied to the two arm portions as a result of the object being askew. The sideward swing of the engaging part about the pivot axes occurs instead of the bridge portion being caused to move through the over center position, and so the engaging part does not move into the release condition.

Figure 14:
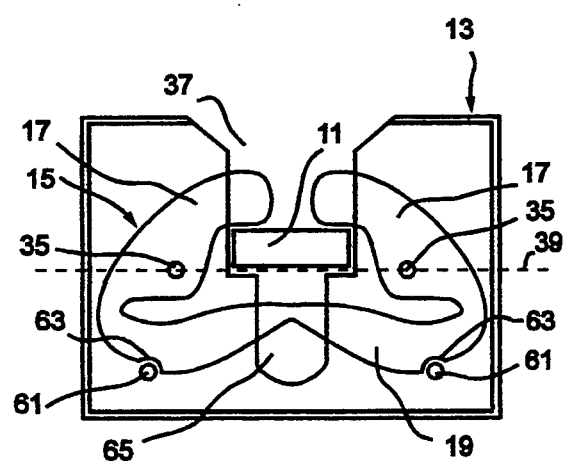
FIG. 14 is a schematic plan view of an engaging device according to still another embodiment.

The embodiment shown in FIG. 14 of the drawings is directed to an engaging device which securely locks the object and resists unintentional releasing of the object even in circumstances where an extreme force is applied to the arm portions by the object. This is achieved by constructing the engaging part so that the bridge portion 19 extends beyond the pivot pins 35 on which the arm portions are mounted. As a result of this arrangement and the configuration of the bridge portion, the latter has a tendency to deflect away from the line 39 extending between the pivot pins rather than towards the line 39 when a pulling force is applied between the object and the engaging device. The supporting part is provided with support pins 61 against which the engaging part bears when in the engaging position, (as shown in the drawing). The support pins provide support for the engaging part to prevent it from deflecting excessively in circumstances where an extreme force is applied to the arm portions by the object 11. The engaging part has notches 63 which receive the pins.

A further feature of the embodiment of FIG. 14 is an aperture 65 provided in the housing 31 to provide access to the underside of the bridge portion 19 so that it can be manipulated manually between its two extreme positions. In this embodiment, the aperture 65 opens onto the inner edge of the recess 37.

Figure 15:
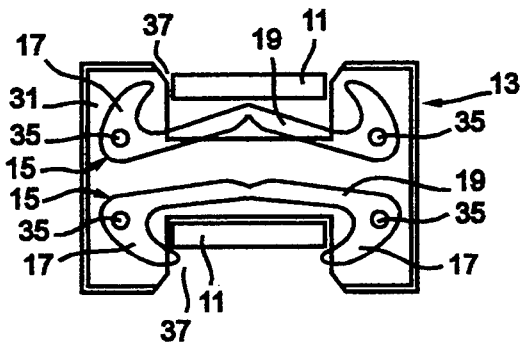
FIG. 15 is a plan view of an engaging device according to still another embodiment incorporating a pair of opposed engaging parts, with one of the engaging parts being shown in an engaging condition and the other being shown in a release condition.

The embodiment shown in FIG. 15 of the drawings is directed to an engaging device which has two engaging parts, so allowing the device to releasably connect two objects together. Each engaging part can operate independently of the other. An access opening (not shown) may be provided in the housing to facilitate manual manipulation of the bridge portion.

Figure 16:
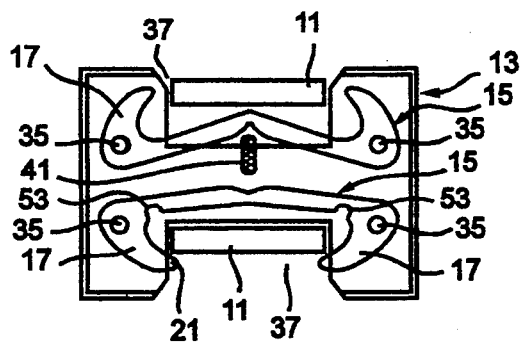
FIG. 16 is a plan view of an engaging device according to still another embodiment which is similar to the embodiment shown in FIG. 15 with the exception that a control means is provided for selectively moving each of the engaging parts separately from the engaging position to the release position.

The embodiment shown in FIG. 16 of the drawings is somewhat similar to the embodiment shown in FIG. 15 with the exception that one of the engaging parts 15 is provided with notches 53 which prevents separation of that engaging part from the object simply by a pulling action. To allow the engaging part to release the object, there is provided a control means 41.

Figure 17:
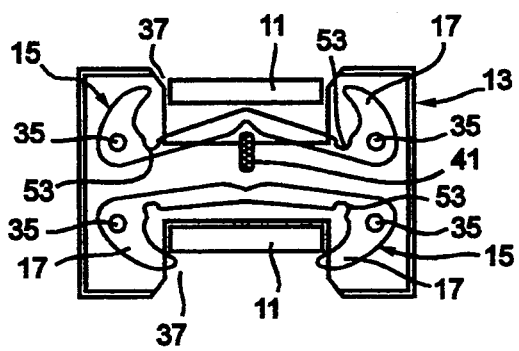
FIG. 17 is a plan view of an engaging device according to another embodiment somewhat similar to the embodiment of FIG. 16.

A variation to the embodiment shown in FIG. 16 is the engaging device shown in FIG. 17 in which each of the engaging parts has notches 53 so requiring the control means 41 to be able to operate each engaging part.

In the embodiments of FIGS. 16 and 17 an access opening could be provided as an alternative to the control means 41.

The embodiments of FIGS. 15, 16 and 17 illustrate the two engaging parts operating in a common plane. It will be appreciated, however, that the two engaging parts can be disposed angularly with respect to each other.

Figure 18:
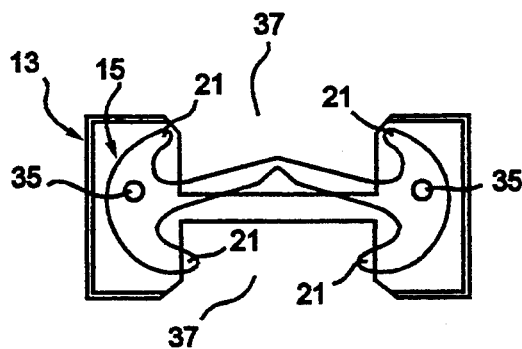
FIG. 18 is a plan view of an engaging device according to still another embodiment in which the engaging part has provision on two sides thereof for engaging an object.

The previous embodiments shown in FIGS. 16 and 17 provide engaging devices which can connect two objects together but they each utilise two engaging parts. An alternative to the two engaging parts is offered by the embodiment shown in FIG. 18 of the drawings where there is only one engaging part but it is provided with two pairs of claws 21. The engaging device according to this embodiment has two recesses 37 in opposed relation in the supporting part and one pair of claws is associated with each recess.

Figure 19:
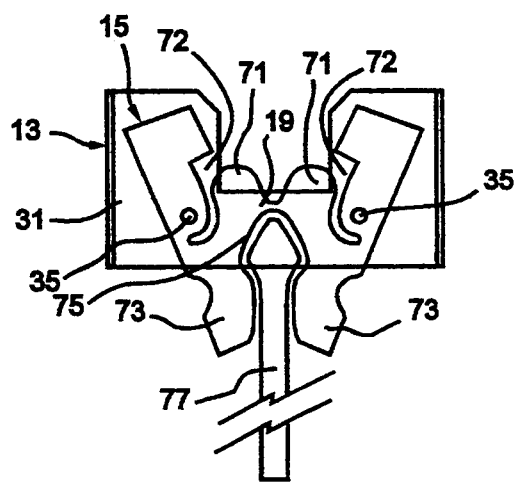
FIG. 19 is a schematic view of an engaging device according to still another embodiment which is well adapted for use as a suspension system which can be released from a remote location using an appropriate releasing tool.

A further embodiment of the engaging device is shown in FIG. 19 of the drawings. In this embodiment, the bridge portion 19 has two spaced apart protrusions 71, each of which extends to a location in the vicinity of a respective one of the claws 18 to define a gap 72 therebetween. With this arrangement, the engaging device can engage an object of thin cross-section in the gaps 72. This is because the engaging device can be constructed with the recess having a depth less than that which would be required without the protrusion.

The embodiment also has a pair of rearward extensions 73 provided on the engaging part. The rearward extensions 73 extend beyond the housing 31 and provide a means by which the engaging part can be manipulated manually between the engaging and release conditions.

A cavity 75 is defined between the rearward extensions 73 and is adapted to receive a tool 77 which can be used to support the engaging device when it is being installed or removed. Additionally, the tool can be used to apply a force to the bridge portion of the engaging part so as to cause it to move from the engaging condition to the release condition. When the engaging part is in the release condition, it embraces the tool so that it is supported on the end of the tool. This allows a user to hold the engaging device by means of the tool from a remote location once the engaging device has been released from the object. This is particularly useful in a situation where the engaging device is being mounted in an elevated location which is not particularly accessible to the user.

Figure 20:
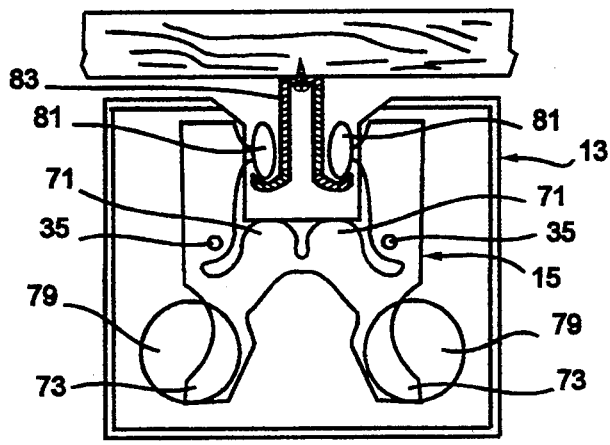
FIG. 20 is an elevational view of an engaging device according to another embodiment adapted to engage a track for movement therealong, the engaging device being shown in the engaging position.
Figure 21:
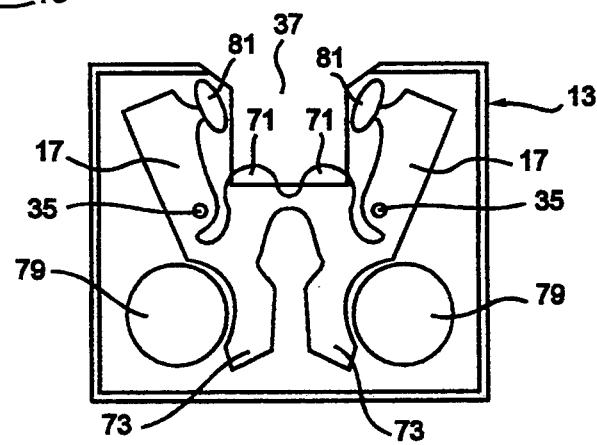
FIG. 21 is a view of the engaging device shown in FIG. 20 with the exception that it is shown in the release condition separated from the track.

The embodiment shown in FIGS. 20 and 21 of the drawings also has two protrusions 71 and rearward extensions 73 similar to the previous embodiment. In this embodiment, however, the rearward extensions 73 do not extend beyond the housing but rather co-operate with openings 79 which are formed in the housing and which provide access to the extensions. This arrangement provides a safety feature in that it ensures that there are no protruding parts which could be accidentally operated to cause the engaging device to release.

Another feature of this embodiment is that the arm portions do not have claws but rather support rollers 81 which can releasably engage a track 83 on movement of the engaging part 15. A particular advantage of this construction is that the engaging device can be fitted onto the track at any position along the length of the track. This arrangement overcomes a disadvantage of many conventional structures which carry rollers for engagement with a track, the disadvantage being that the structure can only be fitted onto the track from the ends of the track or through entry points provided at intervals along the length of the track.

Figure 22:
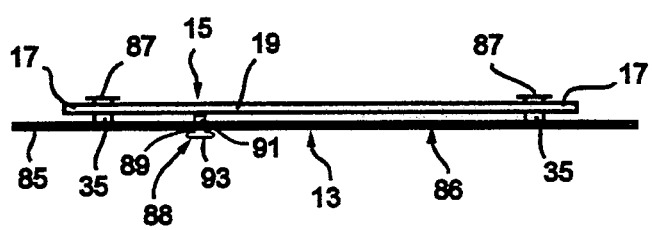
FIG. 22 is a schematic side view of an engaging device according to still another embodiment having stop means to limit the extent of lateral deflection of the engaging part as it moves through an unstable zone between the engaging and release conditions.

In the embodiments described previously, the engaging part 15 is accommodated within the cavity in the housing 31 and the side walls 33 of the housing can serve to limit the extent of lateral deflection of the engaging part as it passes between the two stable positions. An alternative arrangement is shown in FIG. 22 of the drawings where the supporting part 15 simply comprises a plate 85 which carries the pivot pins 35. The free ends of the pivot pins have stops 87 for retaining the engaging part in position. A limiting means 88 is provided for limiting the extent of lateral deflection of the engaging part away from the plate. In this embodiment, the limiting means 88 comprises a pin 89 mounted on the bridge portion 19 of the engaging part and extending through a slot (not shown) formed in the plate. The free end of the pin extends beyond the opposed face 86 of the plate 85 and has a protrusion 93 so dimensioned that it cannot pass through the slot formed in the plate. The protrusion is spaced from the opposed face 86 of the plate to accommodate some lateral deflection of the engaging part but is adapted to move into contact with the opposed face to limit further lateral deflection once the allowable extent of deflection has been achieved.

Figure 23:
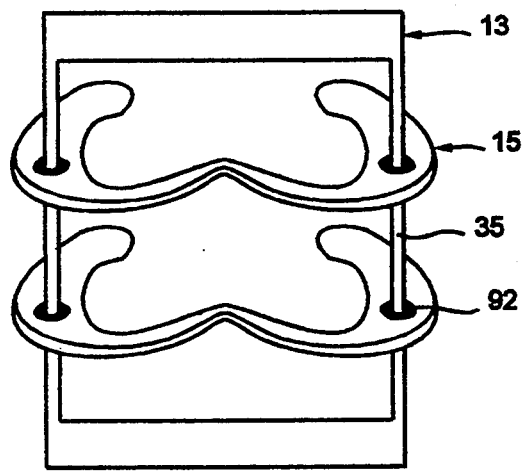
FIG. 23 is a schematic view of an engaging device according to still another embodiment in which there are a plurality of engaging parts mounted on common pivot axes.

The embodiment shown in FIG. 23 of the drawings illustrates an arrangement where the engaging device has a plurality of engaging parts 15 mounted on a common supporting part 13. In this instance, the engaging parts are mounted on common pivot pins 35 and are retained in position by stops 92 on the pivot pins. The arm portions of the engaging parts 15 can be of various sizes and configurations to facilitate gripping of objects of irregular shape. Furthermore, a linking element (not shown) may extend between the various engaging parts so that they can be operated in unison.

Figure 24:
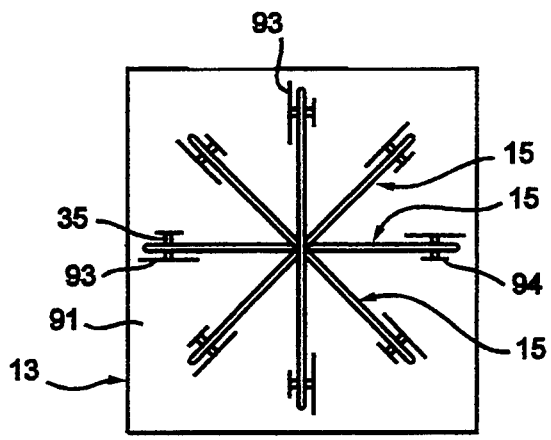
FIG. 24 is a plan view of an engaging device according to still another embodiment for releasably engaging an object in a claw-like fashion.

In FIG. 24 of the drawings there is also illustrated an embodiment in which there are a plurality of engaging parts 15 mounted on a common supporting part 13. In this instance, however, the engaging parts do not have common pivot axes but are arranged in angular fashion to provide a claw-like structure which can engage around an object. The various engaging parts 15 contact each other in the central region such that they are caused to move in unison between the engaging and release conditions. A control means (not shown) may extend through an opening in the plate 91 and be operatively coupled to the engaging parts 15 so that they can be operated remotely. The engaging parts are mounted on pivot pins 35 each of which is supported on one end of a bracket 93. The other end of each pivot pin 35 has a protrusion 94 for retaining the engaging part in position.

The engaging device according to this embodiment is particularly suitable for engaging objects of compact shape such as generally square and spherical objects. In other embodiments, the arm portions of the engaging parts 15 can be of various sizes and configurations to facilitate gripping of objects of irregular shape. This arrangement may find particular application in the area of robotics where items have to be engaged for some form of manipulative process and then released.

Figure 25:
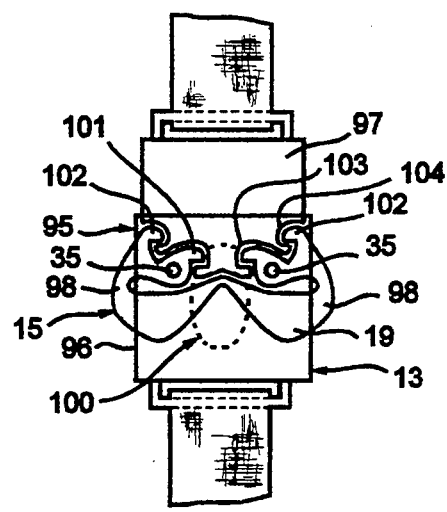
FIG. 25 is a schematic view of an engaging device according to still another embodiment adapted for use in a buckle assembly.

The embodiment shown in FIG. 25 of the drawings is directed to an engaging device suitable for use in a locking device. The locking device is well adapted for use in a buckle assembly 95 comprising first and second parts 96, 97 respectively adapted to be releasably coupled together. The first part 96 incorporates the engaging device according to the embodiment. In this embodiment, the bridge portion 19 extends beyond the pivot pins 35 and also beyond opposed sides of the housing 31. This allows the engaging part to be moved from the engaging condition to the released condition simply by pressing the exposed ends 98 of the bridge portion together. A further feature of the engaging device of this embodiment is that each arm portion has two engaging fingers 101, 102 each adapted to engage in complimentary recesses 103, 104 formed in the second part 97 of the buckle. The engaging fingers 101, 102 of each arm portion extend to opposed sides of the pivot pin 35 on which the arm portion is mounted. As a result of this arrangement, pulling forces between the engaging device and the object do not apply rotational torque to the arm portions but rather are simply transferred to the pivot pins 35. Because no torque is applied to the arm portions, there are no forces exerted on the bridge portion of the engaging part and so locking is achieved. An access opening 100 may also be provided for manual operation of the engaging part.

Figure 26:
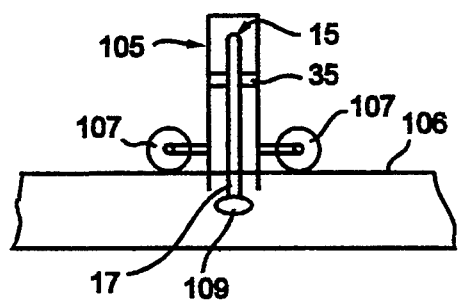
FIG. 26 is a schematic view of an engaging device according to still another embodiment.

The embodiment shown in FIG. 26 is directed to an engaging device incorporated in a mobile structure 105 adapted to travel along a track 106. The mobile structure 105 has wheels 107 for rolling movement along the track 106 and an undercarriage 108 for releasably engaging the underside of the track to retain the mobile structure on the track. The undercarriage comprises the engaging device which has rollers 109 on the arm portions 17 which releasably engage the underside of the track. The mobile structure 105 can be installed on, and removed from, the track 106 at any position along its length simply by moving the engaging device between the engaging and release conditions as appropriate.

Figure 27:
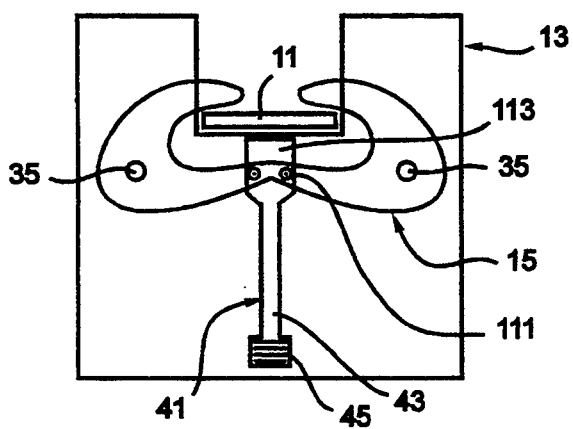
FIG. 27 is a schematic view of an engaging device according to still another embodiment.

Some of the embodiments described earlier have had a control means 41 operable to cause the engaging part to move from the engaging condition to the release condition. In these embodiments, the control means 15 disposed adjacent to but not connected to, the engaging part and is movable into engagement with the engaging part to cause the latter to move from the engaging condition to the release condition. The embodiment shown in FIG. 27 of the drawings is somewhat similar in that it is provided with a control means 41 comprising a control member 43 and a button 45 at the free end of the control member. In this embodiment, however, the control member is pivotally connected to the engaging part at pivots 111. The pivots 111 each comprise a pivot pin located on the control member and a pivot hole in the engaging part. The pivot hole is slightly oversized in relation to the pivot pin received therein to accommodate the movement. Furthermore, the control means has an extension 113 which extends beyond the engaging part so that it protrudes into the recess 37 when the engaging part is in the release condition. With this arrangement, an object entering the recess can contact the extension 113 and cause the engaging part to be moved from the release condition to the engaging condition. This arrangement has a further benefit in that the extension 110 functions in a similar manner to the protrusions 71 of the embodiment shown in FIG. 19 of the drawings, so allowing thin objects to be releasably engaged by the device. This is particularly useful as it allows the engaging device to be constructed with the recess 37 not as deep as would be required without the extension.

Figure 28:
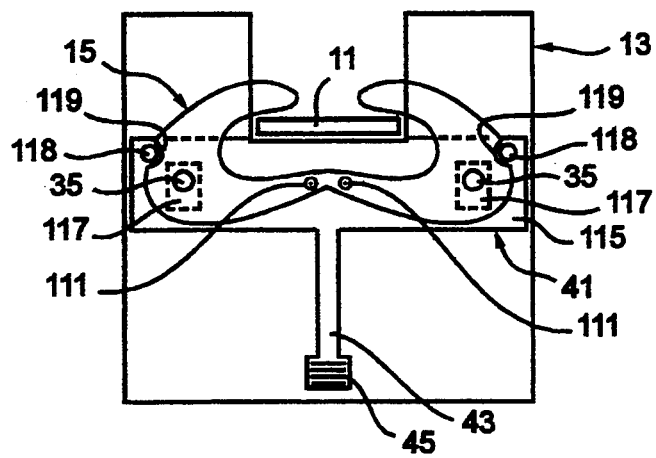
FIG. 28 is a schematic view of yet another embodiment.

The embodiment shown in FIG. 28 is somewhat similar to the immediately preceding embodiment. In this embodiment, however, the control means 41 comprises a slide 115 provided at the inner end of control member 43. The slide 115 is pivotally connected to the engaging part 15 at pivots 111 and is movable reciprocally towards and away from the recess to cause movement of the engaging part between the engaging and release conditions. The slide 115 is provided with slots 117 in which the pivot pins 35 are received to allow the reciprocal movement of the slide. The slide also carries support pins 118 against which the engaging part locates when in the engaging condition, as shown in the drawing. Notches 119 are provided in the engaging part to receive the support pins 118 and this ensures that the engaging device remains locked.

Figure 29:
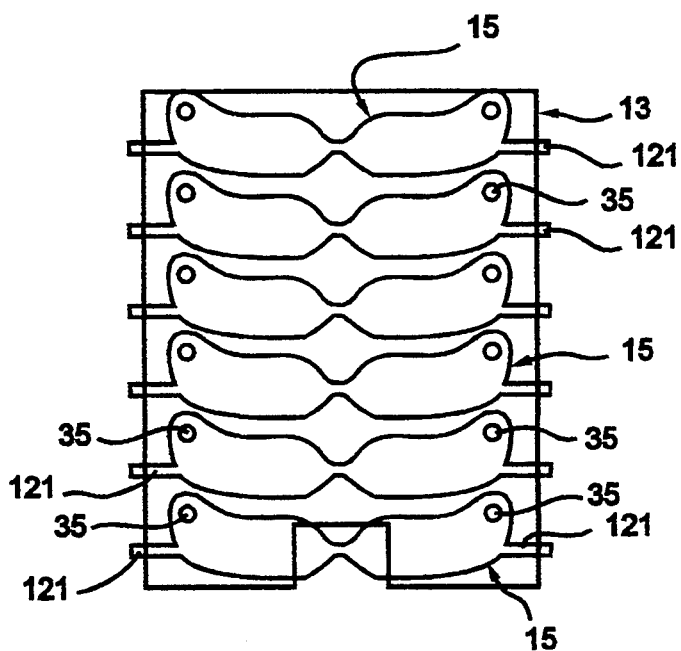
FIG. 29 is a schematic view of an engaging device according to a still further embodiment in which there are a plurality of engaging parts each incorporating engaging pins, the pins being shown in an extended position.
Figure 30:
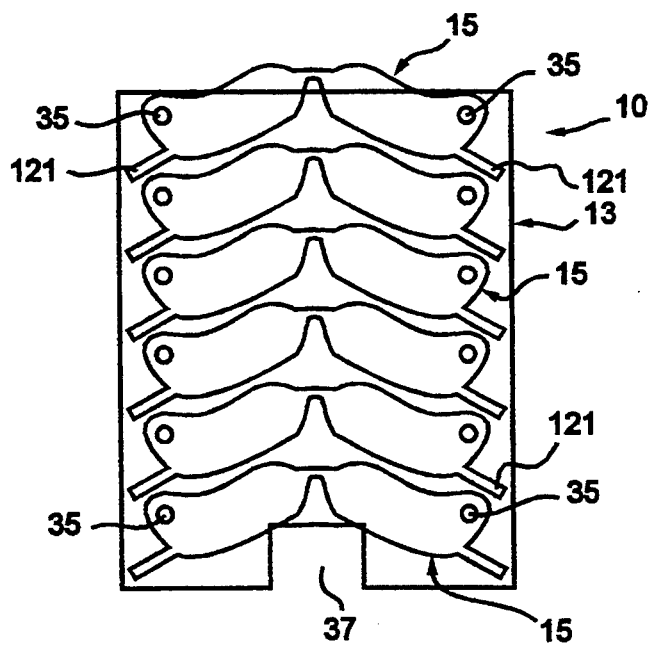
FIG. 30 is a view similar to FIG. 29 with the exception that the engaging device is a condition where the pins are in a retracted position.

In FIGS. 29 and 30 of the drawings there is illustrated a further embodiment having a plurality of engaging parts 15 mounted on a common supporting part 13. The engaging parts 15 are mounted in a series with each engaging part moving about respective pivot pins 35. The arrangement of the engaging parts in series is such that they are operable in a "domino" fashion in the sense that operation of either one of the engaging parts at the ends of the series causes the remaining engaging parts to operate sequentially. The arm portions of each engaging part is provided with a projection 121 which provides an engaging pin. When the engaging parts are in one of the stable conditions, the engaging pins project sidewardly from the housing 31 (as shown in FIG. 29 of the drawings) and when the engaging parts are in the other stable condition, the engaging pins are disposed within the confines of the housing (as shown in FIG. 30).

The engaging pins are arranged to be received in complementary holes formed in an object to which the engaging device is adapted to be releasably secured.

From some of the foregoing embodiments it is evident that the engaging device can be so constructed that forces of different magnitudes are required to engage and release an object. One way in which this can be achieved is to provide weakening sections (such as notches) in the bridge portion, as described. Another way is to construct the engaging part so that the flexure point is asymmetric in relation to the line between the two pivot axes when the engaging part is in the two stable conditions. With this arrangement, less force is required to move the engaging part from stable condition in which flexure point is closer to the line between the two axes than is required to move the engaging part from the stable condition in which the flexure point is farther from the line.

In the various embodiments described, there are features which are described in relation to some embodiments but which are not described and shown as being present in other embodiments. It will be appreciated that such features may, where appropriate, have application to all of the embodiments.

The various embodiments which have been described and illustrated demonstrate that the engaging device according to the invention has a multitude of applications. It should, however, be appreciated that the invention is certainly not limited to the various embodiments described.

The claims defining the invention are as follows:

1. An engaging device for releasably engaging an object, the engaging device comprising a supporting part, an engaging part mounted on the supporting part for pivotal movement about two spaced apart axes between two stable conditions one being an engaging condition and the other being a release condition, wherein the two axes are fixed against lateral displacement with respect to each other during movement of the engaging part between the two stable conditions and wherein a portion of the engaging part disposed between the two axes is of resilient construction to accommodate movement of the engaging part between the two stable conditions and to urge the engaging part into one or the other of the two stable conditions.

2. An engaging device according to claim 1 wherein said portion of the engaging part disposed between the two axes is of resiliently compressible construction.

3. An engaging device according to claim 1 wherein the engaging part comprises two spaced arm portions and an elongated bridge portion extending between said arm portions, said arm portions each being mounted on said supporting part for pivotal movement about a respective one of said pivot axes between a first position corresponding to said engaging condition and a second position corresponding to said release condition, said bridge portion providing said portion disposed between said pivot axes.

4. An engaging device according to claim 3 wherein said bridge portion is resiliently bendable in two mutually perpendicular directions to provide said resilient construction of said portion of the engaging part.

5. A device according to claim 4 wherein said mutually perpendicular directions comprise a first direction generally parallel with said pivot axes and a second direction being in the direction of movement of said bridge portion as the engaging part moves between the two stable conditions.

6. A device according to claim 3 wherein at least part of said bridge portion passes through a center line extending between said pivot axes as the engaging part moves between the two stable conditions.

7. A device according to claims 4 wherein said bridge portion is provided with a reduced section to accommodate resilient bending of the engaging part.

8. An engaging device according to claim 7 wherein said reduced section comprises a flexure point formed in said bridge portion.

9. An engaging device according to claim 1 wherein each of said pivot axes is defined by a pivot pin provided on the supporting part.

10. An engaging device according to claim 3 wherein each of said axes is defined by a pivot pin provided on said supporting part and wherein a hole is provided in each arm portion for receiving a respective one of said pivot pins, the spacing between said holes prior to the pivot pins being received therein being slightly larger than the spacing between said pivot pins so that axial compression is induced in said bridge portion as the engaging part moves between the two stable conditions.

11. An engaging device according to claim 3 wherein said arm portions and said bridge portion are formed integrally with each other.

12. An engaging device according to claim 11 wherein the integral arm portions and bridge portion are formed from a laterally bendable sheet of plastics material.

13. An engaging device according to claim 3 wherein said supporting part comprises a housing and said engaging part is accommodated within said housing, said housing defining a recess to receive said object, said bridge portion being movable with respect to the recess between two extreme positions as said arm portions move between said first and second positions wherein when in one of said extreme positions said bridge portion is exposed for contact with said object as said object enters said recess, said bridge portion being adapted to move from said one extreme position into said other extreme position upon application thereto of a predetermined contact force by the object.

14. An engaging device according to claim 13 wherein said arm portions co-operate with said recess to confine said object within said recess when said arm portions are in said first position.

15. An engaging device according to claim 14 wherein said bridge portion is adapted to move from said one extreme position into said other extreme position upon the application of a force of predetermined magnitude to said arm portions, said force arising as a result of reaction between said arm portions and said object on the application of a pulling force between the object and the engaging device.

16. An engaging device according to claim 13 wherein an access opening is provided in said housing for manual manipulation of the bridge portion between the two extreme positions.

17. An engaging device according to claim 13 further comprising a control means operable to move said bridge portion from said one extreme position to said other extreme position.

18. An engaging device according to claim 17 wherein said control means comprises a control member movably mounted on the supporting part for operative engagement with said bridge portion.

19. An engaging device according to claim 3 wherein said engaging part is adapted to resist movement from said first position into said second position in response to the application of a pulling force between the object and the engaging device.

20. An engaging device according to claim 19 wherein said engaging part is adapted to resist movement from said engaging condition to said release condition by provision of a weakening section in the engaging part.

21. An engaging device according to claim 1 wherein said bridge portion extends beyond the two axes about which the arm portions are mounted on the supporting part.

22. An engaging device according to claim 13 wherein the bridge portion is provided with two spaced apart protrusions each of which is adapted to extend into said recess when the engaging part is in the release condition.

23. An engaging device according to claim 1 wherein said engaging part is provided with two extensions each extending in the opposed direction to a respective one of the arm portions, said extensions providing means by which the engaging part can be manipulated between the engaging and the release conditions.

24. An engaging device according to claim 23 wherein said extensions extend beyond said housing.

25. An engaging device according to claim 23 wherein said extensions are disposed within the confines of said housing and an opening means is provided in said housing for access to said extensions.

26. An engaging device according to claim 23 wherein a cavity is defined between said extensions, said cavity being adapted to receive a tool.

27. An engaging device according to claim 1 adapted to releasably engage two objects.

28. An engaging device according to claim 27 wherein there are two of said engaging parts each adapted to engage one of said objects.

29. An engaging device according to claim 27 wherein the engaging part is provided with two pairs of arm portions, each arm portion being adapted to engage one of the objects.

30. An engaging device according to claim 3 wherein the or each engaging part comprises two fingers extending to opposed sides of the pivot axis about which the arm portion moves, said fingers being adapted to releasably locate in complementary recesses in the object.

31. An engaging device according to claim 1 wherein said supporting part provides access to the inner side of the engaging part.

32. An engaging device according to claim 1 wherein the engaging part is of such construction that the force required to move the engaging part in one direction between the two stable conditions is of a different magnitude to the force required to move the engaging part in the opposite direction.

33. An engaging device according to claim 32 wherein said construction includes a weakening section provided in the engaging part.

34. An engaging device according to claim 32 wherein said construction is such that the engaging part has a bridge portion which is asymmetric in relation to a line between the two pivot axes when the engaging part is in the two stable conditions.

35. An engaging device according to claim 1 wherein the supporting part is substantially rigid.

36. An engaging device for releasably engaging an object, the engaging device comprising a supporting part, an engaging part mounted on the supporting part for pivotal movement about two spaced apart axes between two stable conditions one being an engaging condition and the other being a release condition, the two axes being defined by means carried on a portion of the supporting part, the engaging part being located to one side of said portion of the supporting part in a direction along the pivot axes such that the engaging part is offset from said portion of the supporting part.

37. An engaging device according to claim 36 wherein said means defining the two axes comprises two pivot pins at least one end of each of which is supported on said portion of the supporting part offset from the engaging part.

38. An engaging device according to claim 37 wherein the pivot pins are rigidly fixed to the supporting part and the section of the supporting part between the two pivot pins is substantially rigid.

39. An engaging device according to claim 37 wherein the supporting part comprises a housing for accommodating the engaging part, the pivot pins being carried by the housing.

40. An engaging device according to claim 37 wherein the supporting part comprises a support plate, the pivot pins being mounted at one end thereof on the support plate.

41. An engaging device according to claim 36 wherein portion of the engaging part disposed between the two axes is of a construction which accommodates movement of the engaging part between the two stable conditions and which urges the engaging part into one or the other of the stable conditions.

42. An engaging device according to claim 41 wherein the construction of said portion of the engaging part is such that it is resiliently compressible.

43. An engaging device for releasably engaging an object, the engaging device comprising a substantially rigid supporting part, an engaging part mounted on the supporting part for pivotal movement about two spaced apart axes between two stable conditions one being an engaging condition and the other being a release condition, wherein the two axes are fixed both with respect to the supporting part and with respect to each other during movement of the engaging part between the two stable conditions and wherein a portion of the engaging part disposed between the two axes is of a construction which accommodates movement of the engaging part between the two stable conditions and which urges the engaging part into one or the other of the two stable conditions.

44. An engaging device according to claim 43 wherein the construction of said portion of the engaging part is such that it is resiliently compressible.

45. An engaging device for releasably engaging an object, the engaging device comprising a supporting part, an engaging part mounted on the supporting part for movement between engaging and release conditions, said engaging part having a first portion comprising a pair of arm portions and a second portion comprising a bridge portion extending between the arm portions, the first portion being adapted to co-operate with said supporting part to engage the object when in the engaging condition, the second portion being exposed for contact with the object when the engaging part is in the release condition whereby upon such contact at a predetermined magnitude of force said engaging part is caused to move from the release condition into the engaging condition.

46. An engaging device as claimed in claim 45 wherein said supporting part is provided with a recess for receiving said object wherein the object is releasably retained in said recess when the first portion of the engaging part is co-operating with said supporting part.

47. An engaging device according to claim 46 wherein said arm portions extend into said recess when the engaging part is in the engaging condition and the bridge portion extends into the recess when the engaging part is in the release condition.

48. An engaging device according to claim 47 wherein said arm portions are located wholly within the confines of the supporting part when the engaging part is in the release condition.

49. An engaging device according to claim 45 wherein said supporting part comprises a housing accommodating said engaging part.

50. An engaging device according to claim 49 wherein the housing comprises a pair of spaced apart housing walls defining a cavity therebetween in which the engaging part is accommodated.

51. An engaging device for releasably engaging an object, the engaging device comprising a supporting part, an engaging part mounted on the supporting part for pivotal movement about two spaced apart axes between two stable conditions one being an engaging condition and the other being a release condition, said engaging part having a bridge portion which is asymmetric in relation to a line extending between the two axes when the engaging part is in the two stable conditions such that the bridge portion is closer to said line when in one of said stable conditions than when in the other of said stable conditions, whereby in use less force is required to move the engaging part from said one of the stable conditions in which the bridge portion is closer to said line than is required to move the engaging part from said other of said stable conditions.

52. An engaging device according to claim 51 wherein the engaging part is adapted to resist movement from said engaging condition into said release condition in response to the application of a pulling force between the object and the engaging device.

53. An engaging device for releasably engaging an object, the engaging device comprising a supporting part, an engaging part mounted on the supporting part for pivotal movement about two spaced apart axes between two stable conditions one being an engaging condition and the other being a release condition, wherein the two axes are fixed against lateral displacement with respect to each other during movement of the engaging part between the two stable conditions and wherein a portion of the engaging part disposed between the two axes is of resilient construction to accommodate movement of the engaging part between the two stable conditions.

54. An engaging device according to claim 1 wherein the engaging part comprises two spaced arm portions each being mounted on said supporting part for pivotal movement about a respective one of said pivot axes between a first position corresponding to said engaging condition and a second position corresponding to said release condition, each arm portion supporting a roller for rolling engagement with a track.

55. An engaging device according to claim 1 wherein there is a plurality of said engaging parts mounted on the supporting part to provide a claw-like structure for releasably engaging an object.

56. An engaging device according to claim 55 wherein each engaging part comprises two spaced arm portions and an elongated bridge portion extending between said arm portions, the bridge portions cooperating one with another such that the engaging parts are movable in unison between the engaging and release conditions.

57. An engaging device according to claim 1 wherein there are a plurality of said engaging parts mounted on the supporting part, said engaging parts each being mounted for pivotal movement about said two spaced apart axes.

58. An engaging device according to claim 1 wherein the engaging part comprises two spaced arm portions and an elongated bridge portion extending between said arm portions, said arm portions each being mounted on said supporting part for pivotal movement about a respective one of said pivot axes between a first position corresponding to said engaging condition and a second position corresponding to said release condition, said bridge portion providing said portion disposed between said pivot axes, and a control means for selectively moving the engaging portion between the two stable conditions, the control means comprising a control member supported for reciprocal movement, the control member having a portion pivotally connected to the bridge portion about a pivot axis substantially parallel to said two pivot axes whereby the supporting part is caused to move between the two stable conditions upon reciprocal movement of the control member.

59. An engaging device according to claim 58 wherein said portion of the control member comprises a slide carrying means against which the engaging part locates when in the engaging condition thereby to lock the engaging part in the engaging condition.

* * * * *

UNITED STATES PATENT AND TRADEMARK OFFICE
CERTIFICATE OF CORRECTION

PATENT NO. : 5,446,948
DATED : Sep. 5, 1995
INVENTOR(S) : Claude P. Genero; Gail A. Genero It is certified that error appears in the above-indentified patent and that said Letters Patent is hereby corrected as shown below:

Column 1, line 63, change "which" to read --with--.

Column 1, line 67, change "with" to read --which--.

Column 4, line 17, change "," to read --.--.

Column 5, line 60, change "in-an" to read --in an--.

Column 6, line 2, change "crosssection" to read --cross-section--.

Column 6, line 11, after object, insert --11--.

Column 15, line 3, change "claims" to read --claim--.

Column 17, line 11, delete "offset from".

Column 17, line 12, delete "the engaging part".

Signed and Sealed this

Twentieth Day of August, 1996

Attest:

BRUCE LEHMAN

Attesting Officer

Commissioner of Patents and Trademarks